(12) United States Patent
Horesh

(10) Patent No.: US 11,500,885 B2
(45) Date of Patent: Nov. 15, 2022

(54) GENERATION OF INSIGHTS BASED ON AUTOMATED DOCUMENT ANALYSIS

(71) Applicant: INTUIT INC., Mountain View, CA (US)

(72) Inventor: Yair Horesh, Kfar-Saba (IL)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 17/219,546

(22) Filed: Mar. 31, 2021

(65) Prior Publication Data

US 2022/0318254 A1    Oct. 6, 2022

(51) Int. Cl.
*G06F 16/2457* (2019.01)
*G06F 40/205* (2020.01)
*G06N 20/20* (2019.01)

(52) U.S. Cl.
CPC ...... *G06F 16/24578* (2019.01); *G06F 40/205* (2020.01); *G06N 20/20* (2019.01)

(58) Field of Classification Search
CPC .. G06F 16/24578; G06F 40/205; G06F 9/466; G06N 20/20; G06Q 40/025
USPC ........................................................ 707/723
See application file for complete search history.

(56) References Cited

U.S. PATENT DOCUMENTS

| | | | | |
|---|---|---|---|---|
| 10,303,771 B1* | 5/2019 | Jezewski | ............... | G06K 9/627 |
| 11,004,146 B1* | 5/2021 | Ram | ................... | G06Q 40/025 |
| 11,270,375 B1* | 3/2022 | Jennings | ............... | G06Q 40/125 |
| 2014/0245115 A1* | 8/2014 | Zhang | .................. | G06F 40/103 |
| | | | | 715/202 |
| 2015/0309990 A1* | 10/2015 | Allen | .................... | G06F 40/177 |
| | | | | 704/9 |
| 2017/0300561 A1* | 10/2017 | Kannan | ............... | G06F 16/3344 |
| 2019/0251172 A1* | 8/2019 | Jezewski | ................ | G06F 16/30 |
| 2021/0201400 A1* | 7/2021 | Liu | ........................ | G06N 20/00 |
| 2022/0036387 A1* | 2/2022 | Papadimitriou | ... | G06Q 30/0202 |

FOREIGN PATENT DOCUMENTS

JP    2016118932    *  6/2016    .......... G06Q 40/025

* cited by examiner

*Primary Examiner* — Belix M Ortiz Ditren
*Assistant Examiner* — Abdullah A Daud
(74) *Attorney, Agent, or Firm* — Patterson & Sheridan, LLP

(57) ABSTRACT

Certain aspects of the present disclosure provide techniques for generating an insight, comprising: receiving a request to generate an insight for a document from a user associated with the document; receiving the document; generating a tree based on the document; parsing the tree based on a set of rules to generate a set of results associated with the tree; mapping the set of results to a subset of insight elements of a set of insight elements associated with a set of trees including the tree; providing, to a first machine-learning model, the subset of insight elements; receiving, from the first machine-learning model, an insight for the document based on the subset of insight elements; and returning the insight for the document to the user.

14 Claims, 9 Drawing Sheets

- 202a — Name of Business: Young Business, Inc.
- 202b — Gross Income: $100,000
- 202c — Taxable Income: $90,000
- 202d — Expenses: $40,000
- 202e — Profit: $20,000
- 202f — Total Customers: 950
- 202g — Total Items Sold: 2,500
- 202h — Asset Depreciation: $3,000
- 202i — Returning Customers: 600
- 202j — Customers Paying Installments: 400
- 202k — Paycheck Protection Program: No
- 202l — Loan Repayment Program: Yes
- 202m — No Program: No
- 202n — Total Loan Interest Paid: $5,000
- 202o — Total Loan Principal Paid: $20,000
- 202p — Intuit Ads?: Current
- 202q — Start Date: 01/01/2021

GENERATION OF INSIGHTS BASED ON AUTOMATED DOCUMENT ANALYSIS

Aspects of the present disclosure relate to generating insights for an entity based on automated document analysis.

Organizations often create complex documents regarding the status of their operations. Such documents may imply latent conditions of the organization that are not obvious by just viewing the documents themselves. Conventionally, organizations have relied on experts to help derive insights from these otherwise dense documents, however, such practices are expensive, time-consuming, and subjective (and thus not consistently repeatable).

Accordingly, there is a need for methods for generating insights based on automated analysis of documents.

BRIEF SUMMARY

Certain embodiments provide a method for generating an insight. The method generally includes receiving a request to generate an insight for a document from a user associated with the document; receiving the document; generating a tree based on the document; parsing the tree based on a set of rules to generate a set of results associated with the tree; mapping the set of results to a subset of insight elements of a set of insight elements associated with a set of trees including the tree; providing, to a first machine-learning model, the subset of insight elements; receiving, from the first machine-learning model, an insight for the document based on the subset of insight elements; and returning the insight for the document to the user.

Other embodiments provide processing systems configured to perform the aforementioned method as well as those described herein; non-transitory, computer-readable media comprising instructions that, when executed by one or more processors of a processing system, cause the processing system to perform the aforementioned method as well as those described herein; a computer program product embodied on a computer-readable storage medium comprising code for performing the aforementioned method as well as those further described herein; and a processing system comprising means for performing the aforementioned method as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 2A and 2B depict an example document and example tree derived from the document.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for generating insights based on automated analysis of documents.

Generating insights about a particular organization's operations is generally challenging. Organizations generate massive volumes of data of many different sorts. Conventionally, an organization may have tasked an expert with sorting through the data to generate feedback on the organization's operations, but these methods have proven unreliable for several reasons. First, human experts are generally experts in a limited domain, and are thus unable to process a wide variety of data, especially where it is outside of their technical domain. Second, human experts are inherently subjective, and two different experts may often come to two different conclusions based on the same underlying data. Third, human experts are slow at processing large volumes of data, especially when presented in disparate formats and where the meaningful and not meaningful data is not easily distinguishable. Simply put, human experts are not able to perform the sort of complex automated analysis in their minds given the inherently challenging analytical task of generating insights from huge volumes of structured and unstructured organization data.

In order to overcome the challenges of conventional methods, embodiments described herein describe an automated approach to processing organization data to generate meaningful insights about the organization's operations. In various embodiments, data (e.g., documents) are transformed to a structured format, such as a tree-like object, so that the data are more amenable to automatic processing. This transformation allows for automated matching of data elements (e.g., leaves of the tree-like object) to insight elements based on rules. The insight elements may then be combined by a trained machine learning model to form an insight for delivery to a user.

Beneficially, insights generated in this manner represent objective intelligence regarding the operation of an organization based on many different types of input data. Unlike conventional methods, the insight generation methods described herein are based on trained artificial intelligence models that can consider a wider variety of data more consistently, and without subjective bias or inconsistency. The methods described herein thus represent a technical solution to an extant technical problem in the related art in that they provide a scalable, repeatable, and accurate way to assess data regarding an organization without the shortcomings of traditional methods.

Example Computing Environment for Generating Automated Insights

Figure 1:
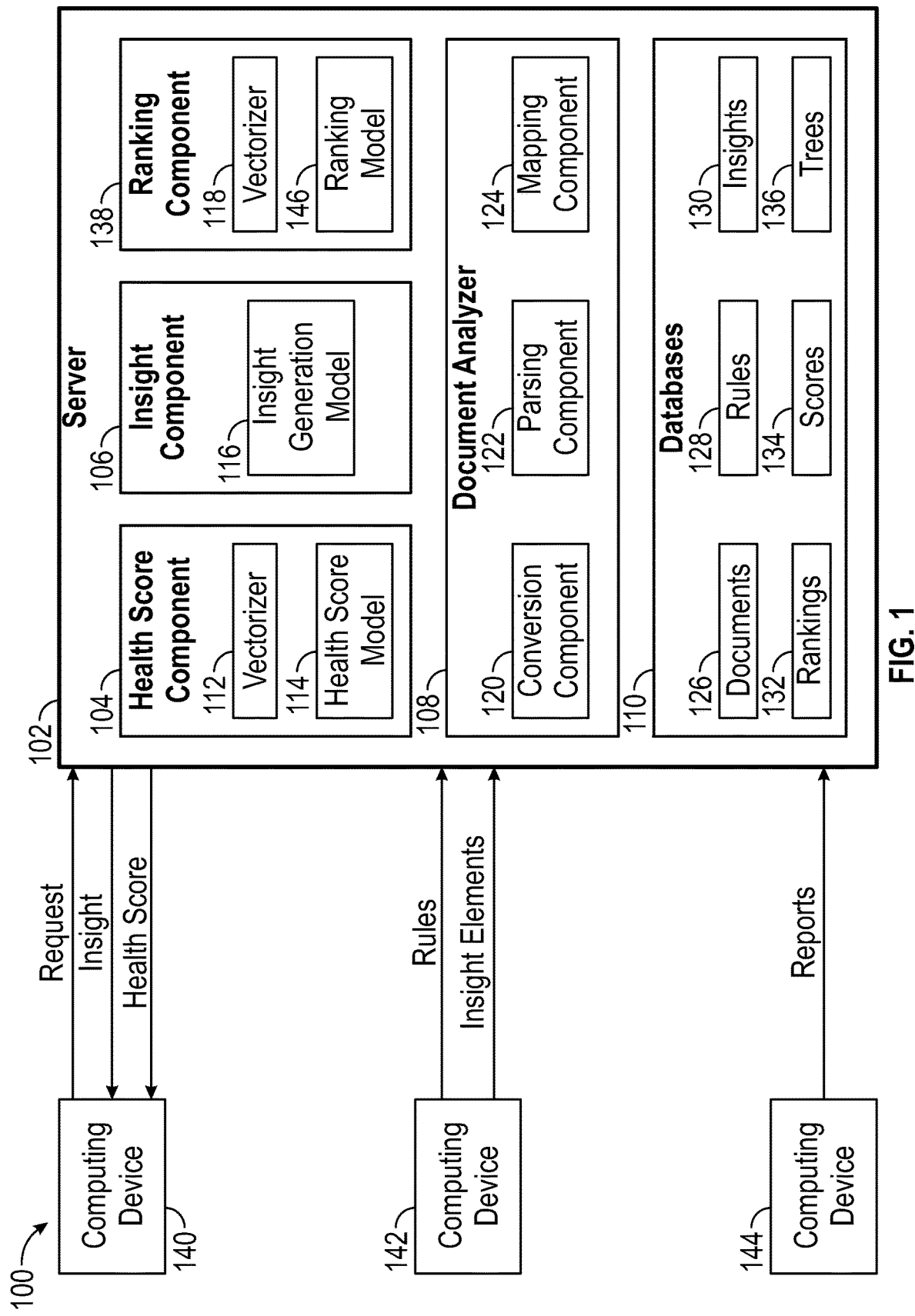
FIG. 1 depicts an example computing environment for generating automated insights.

FIG. 1 depicts an example computing environment 100 for generating automated insights.

Generally, an insight may comprise a textual description regarding one or more aspects of an organization's operations. For example, if the organization is a business, an insight may be related to changes in customer activity, revenue, costs, and the like. If the organization is a government entity, an insight may likewise relate to revenues, costs, head counts, budgets, and the like. If the organization is an individual, an insight may again relate to revenues, costs, assets, and possibly personal information. As described further herein, insights may be generated by trained machine learning models based on insight elements matched to data provided for analysis. Each insight element may be associated with a particular topic, such as "Customer", "Income", or "Assets".

As illustrated, the computing environment 100 includes a server 102 interacting with one or more computing devices, such as computing devices 140, 142, and 144. In this example, the server 102 includes a health score component 104, an insight component 106, a document analyzer 108, a ranking component 138, and databases 110. The server may communicate one or more requests, files, records, or data with the computing devices 140, 142, and 144.

Computing devices 140, 142, and 144 can each include, for example, a desktop computer, a laptop computer, a tablet computer, a smartphone, a smart wearable device, a virtual machine, and other types of computing devices. The computing devices 140, 142, and 144 may contain one or more files or records that may be sent to and processed by the server 102. The computing devices 140, 142, and 144 may also receive and store one or more files or records that have been processed or generated by the server 102. In some cases, one or more computing devices may process data and create records before sending those records to the server 102.

As shown in this example, the server 102 includes document analyzer 108, which further includes a conversion component 120, a parsing component 122, and a mapping component 124. Generally, document analyzer 108 analyzes one or more documents received from a computing device, or, in some cases, documents that are already stored on server 102 (e.g., in documents 126). Before receiving documents, a set of insight elements and a set of rules may be received from a computing device, such as computing device 142, and stored on the server (e.g., at insights 130 and rules 128).

In one embodiment, the set of rules and set of insight elements are received from a computing device associated with one or more experts (e.g., computing device 142). In another embodiment, the set of rules and set of insight elements are defined on server 102 and stored in rules 128 and insights 130. Further, rules 128 and insights 130 may be updated with new rules and new insights.

In this example, document analyzer 108 converts one or more documents into a tree-like object (referred to herein as a "tree") with conversion component 120 so that information in the documents may be extracted from the tree and later manipulated into results that can be mapped to insight elements. In one embodiment, the tree may be embodied in a Java Script Object Notation (JSON) object or an extensible markup language (XML) file, but other types of structured data files are possible. In some examples, each document and its related tree is associated with an organization, and generally an organization may be associated with many documents and trees.

A tree converted from a document may be stored in trees 136 after conversion. In various examples described herein, the documents may be historical documents, which may be used for training data, or current documents, which may be used for insight generation.

Document analyzer 108 parses a tree generated from a document for specific data related to rules using parsing component 122. Rules may be coded expressions that, when executed, may perform one or more functions with regards to the leaves of a tree to generate a result. For example, certain rules may be used to extract values or text from a tree as a result. Additionally, certain rules may use extracted values or text from a tree as a result and perform a calculation to transform the result into a different result. Further, certain rules may compare or manipulate certain results associated with a first tree in relation to results associated with a second tree in order to obtain a new result for first tree.

Document analyzer 108 maps the results (e.g., created by parsing component 122) to insight elements stored on server 102 by using mapping component 124. Each result may be mapped to one or more insight elements based on a value, text, or pattern of the result and the associated rule. Generally, each insight element will contain a textual description explaining the value, text, or pattern of the result. The document analyzer may collect all insight elements associated with the results of parsing the tree to create a set of insight elements. In some embodiments, the set of insight elements associated with that tree will be a subset of all insight elements stored in the server 102 (e.g., at insights 130).

The server 102 further includes insight component 106, which generates an insight associated with a document based on a set of insight elements. In this example, insight component further includes insight generation model 116 that can use natural language processing (NLP) techniques, such as a Bidirectional Encoder Representations from Transformers (BERT) model, a Generative Pre-trained Transformer 3 (GPT-3) model, or a GPT-2 model to generate an insight from a set of insight elements.

In this example, the server 102 further includes ranking component 138, which determines a specific order of insight elements in the insight by ranking each insight element. Ranking component 138 may rank insights according to one or more criteria received from a computing device, such as computing device 140 or 142. Probabilities associated with each insight element may be used by vectorizer 118 in order to create a vector of probabilities for each insight element, which may be input to a ranking model 146 in order to generate a ranking score for each insight element that may be used by ranking component 138 to order the insight elements.

In various embodiments, the ranking model 146 may be a regression model, such as an XGBoost regressor, a linear regression model, or a decision tree regression model that may receive the vector as input and output a score to be ranked. In some embodiments, the insight component 106 may receive and use the order when an insight is generated. The ranking scores for each insight element in a specific set of insight elements or all insight elements in insights 130 may be stored in rankings 132, which may update ranking scores stored in rankings 132 if new insights are created and ranked.

In this example, the server 102 further includes health score component 104, which may generate a health score from a set of insight elements. Health score component 104 further includes vectorizer 112, which may create a vector based on a set of insight elements associated with a document, and a health score model 114, which may generate a health score based on the vector from vectorizer 112. In this example, the health score model 114 may be a regression model, such as an XGBoost regressor, a decision tree regression model, or a linear regression model. In some embodiments, the server 102 may train the health score model 114. The health scores generated by health score component may be stored in scores 134 of databases 110.

In this example, the server 102 further includes databases 110, which may store various databases such as documents 126, rules 128, insights 130, rankings 132, scores 134, and trees 136. As described above, various components of the server 102 can access the various databases in databases 110.

Example Tree Object Based on Document

Figure 2B:
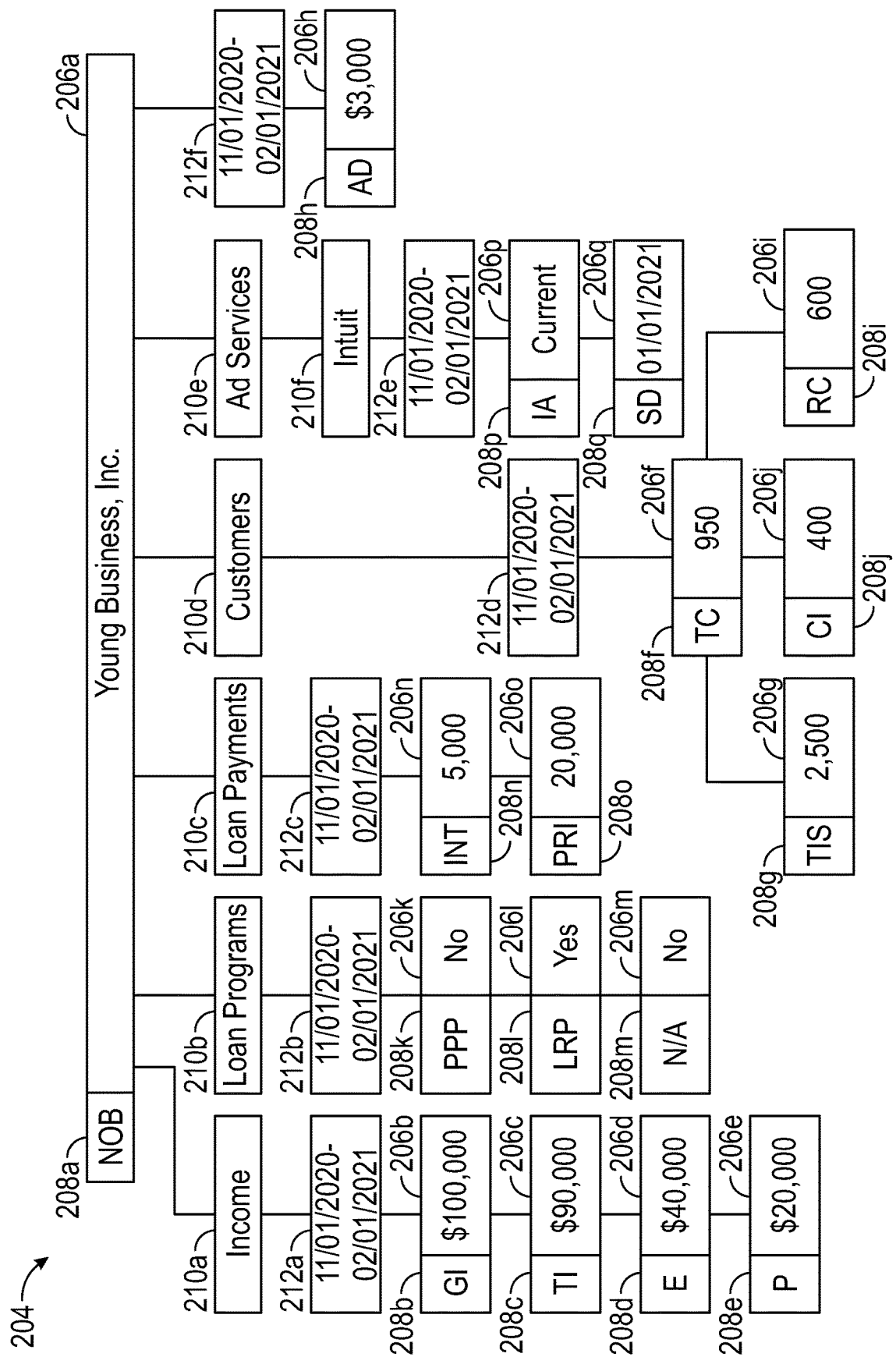

FIGS. 2A and 2B depict a document 200 associated with an organization ("Young Business, Inc." in this example) and a tree 204 based on document 200. In one example, document 200 is converted to tree 204 by server 102 of FIG. 1.

Generally, document 200 may be any sort of data file, including text documents, reports, or spreadsheets, as well as other structured and unstructured data types. In some examples, document 200 may be a type of standardized report for an organization, such as an income report, asset report, profit and loss report, and the like. Beneficially, such documents generally follow standard conventions from organization to organization, and so may be easier to convert to structured object containers, such as tree objects.

As illustrated, the document 200 includes information about an organization in one or more fields of the document 200. The information, shown in textual elements 202a-202q, may concern particular aspects about a certain organization, such as the name of the organization (e.g., as shown in textual element 202a), the gross income of the organization for a given time period (e.g., as shown in textual element 202b), or the taxable income of an organization for a given time period (e.g., as shown in textual element 202c). While the textual elements 202a-202q are shown as exemplary textual elements containing information about the organization, those textual elements are exemplary, and more textual elements with different types of information may be used. In some embodiments, the document may have other elements that are not textual, such as images. The textual elements may include one or more labels and values, such as "expenses" and "$40,000".

The document 200 may be a physical form, an electronic form, or another type of form. If the document 200 is an electronic form, the server may analyze the document and convert the document 200 into tree 204. If the document 200 is a physical form, the server may perform text recognition on an image of the document 200 in order to extract the textual elements, and then convert the document 200 into tree 204 by using the image of the document and the extracted textual elements. In some examples, the image of the document may be downloaded by the server or sent to the server by a computing device (such as computing device 140, 142, or 144 of FIG. 1).

After the server retrieves or extracts the textual elements 202a-202q, the server (e.g., by conversion component 120 of FIG. 1) converts the document 200 into tree 204, which includes leaves 206a-206q that each correspond to a textual element. In one embodiment, the server may use a recursive function to convert the document 200 into tree 204. In some embodiments, the tree may store as a structured object file, such as JSON object or an XML file.

As depicted in FIG. 2B, the leaves 206a-206q are structured as one or more parent nodes and child nodes, where each parent node is related to the child node. As shown, the parent node and child node are connected by a line (e.g., leaf 206b is connected to leaf 206c). Each set of parent and child nodes may be a part of a branch of parent and child nodes, where each node in the branch is associated with certain metadata elements (e.g., metadata elements 210a-210f and 212a-212f) containing information about the leaves in the branch.

Each leaf 206a-206q includes one or more values and/or text associated with a textual element of document 200. For example, leaf 206a may include the value "$100,000" which is associated with the label "Gross Income" and value "$100,000" in textual element 202a. In some embodiments, a leaf may include text instead of a numerical value. In yet another embodiment, a leaf may include both text and a numerical value. Some of textual elements 202a-202q in document 200 may be converted into numerical values that are contained in one of leaves 206a-206q. For example, a "Yes" may be converted into the number "1" while a "No" may be converted into the number "0".

In this example, each leaf 206a-206q further includes metadata associated with the respective textual element, such as metadata elements 208a-208q associated with certain result topics, which may be used by the server when applying rules to specific results. Metadata elements 208a-208q are displayed as abbreviations of topics related to a value or text of 206a-q (e.g., "GI" of 208b relates to "Gross Income" and "RC" of 208i relates to "Returning Customers"). Other information may be contained in leaves 206a-206q that has a particular pattern, such as a dates (e.g., in leaf 206q). Further, information regarding coordinate locations of fields in the document 200 may also be contained in leaves 206a-206q in order to determine if a tree was properly converted. While the leaves 206a-206q are shown with exemplary values, texts, and patterns, the information contained in the leaves 206a-206q is exemplary and other information may be contained. Further, in some embodiments, leaves may not contain metadata elements 208a-208q.

The server parses tree 204 (e.g., by using parsing component 122 of FIG. 1) in order to further acquire or compare results by applying rules (e.g., from rules 128 of FIG. 1) to one or more of the values, texts, and patterns stored in leaves 206a-206q. Rules may contain one or more expressions and functions in order to manipulate the values and text from the tree to return new values and texts.

For example, the server may calculate a value for an amount of new customers an organization received in a certain time period (such as 350 new customers) by subtracting the value contained in leaf 206i (600, representing returning customers) from the value in leaf 206f (950), representing total customers). Rules may also verify information or extract the information from the leaf. Further, parsing a tree may not be limited to the values, descriptions, and patterns of just one tree, for example, the parsing component may compare values between one or more trees in order to determine new values based on the values of the one or more trees. The server may use metadata, such as metadata elements 208a-208q associated with certain result topics in order to identify the values necessary to apply rules to the results from the tree (e.g., determining a profit per customer of a tree by using metadata elements 208f and 208e to identify and apply a rule to the values of leaves 206f and 206e) or apply rules comparing or manipulating values of the tree to values of other trees (e.g., using metadata element 208b to compare the gross income of one time period, such as 11/01/2020-02/01/2021 identified by metadata element 212a, to the gross income of another time period of another document using the same result topic in another tree that is associated with the other document).

All pieces of information obtained directly from the tree 204, as well as the information determined by applying the rules to the tree are considered results from parsing tree 204 that may be mapped to one or more insight elements, as described below with respect to FIG. 3.

Example Mapping of Parsing Results to Insight Elements

Figure 3:
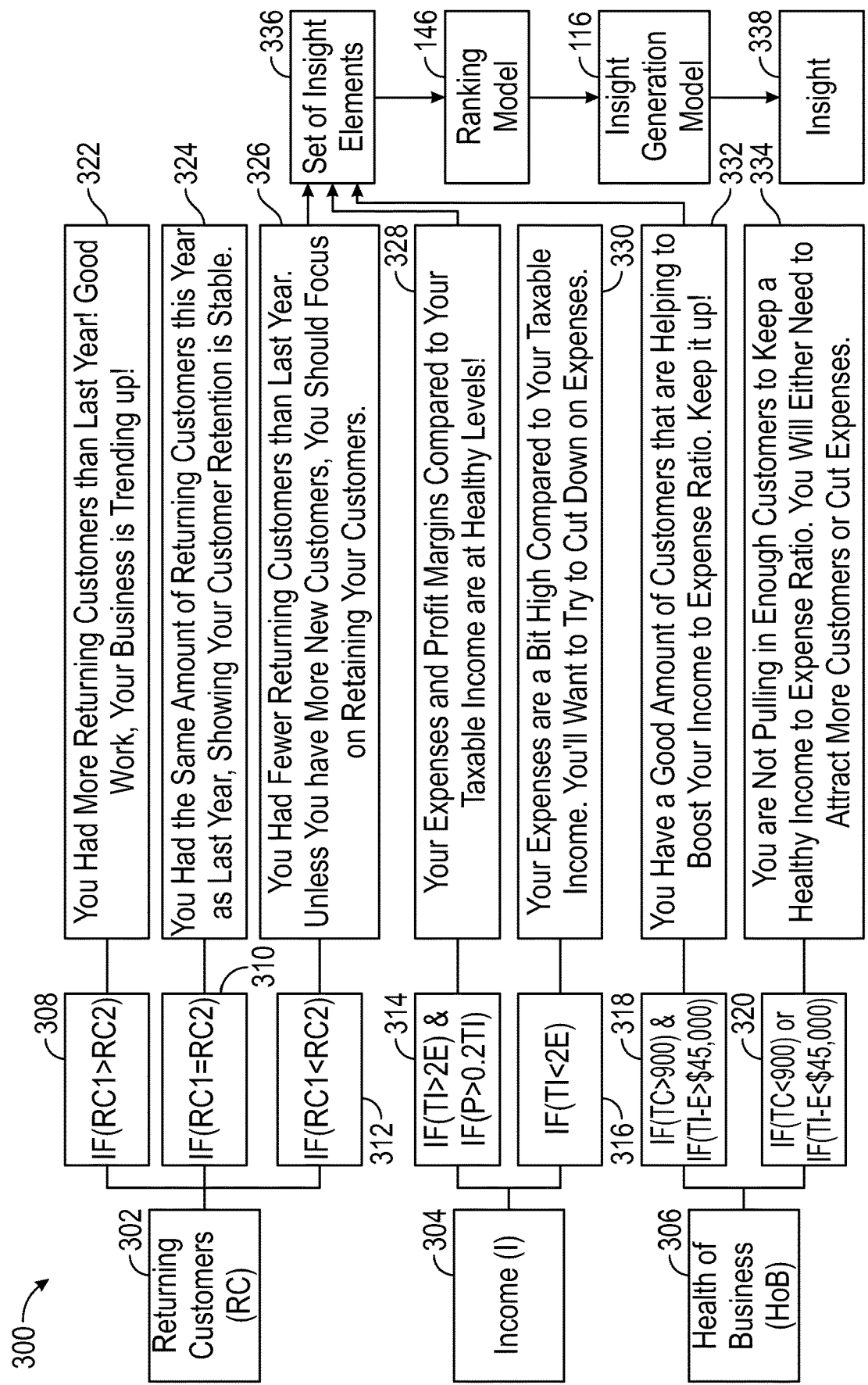
FIG. 3 depicts an example mapping of results to a set of insight elements used to generate an insight.

FIG. 3 depicts an example mapping 300 of results to a set of insight elements 336, such as may be stored on server 102 of FIG. 1.

As illustrated, the example mapping 300 includes insight topics 302-306, rules 308-320 applied to one or more results associated with a tree (e.g., tree 204 of FIG. 2B), and insight elements 322-334. The server can obtain results from parsing a tree as described with respect to FIG. 2B.

In the depicted example mapping 300, insight elements (e.g., 322-334) are mapped to one or more results. For example, the insight topic 302 for "Returning Customers" applies one or more related rules 308-312 to one or more related results from parsing a tree. In doing so, one or more operators may be used to compare results, sum results, divide results, or perform another operation with respect to the results, which allow the results to be mapped to some of insight elements 322-334.

For example, for insight topic 302, if the result obtained from the tree for returning customers (e.g., "RC1" in rule 308) during a first time period (e.g., as shown by metadata element 212e of FIG. 2B) is greater than a result obtained from another tree associated with a same organization during a different time period for returning customers (e.g., "RC2" in rule 308), the server will map the result for returning customers to insight element 322, which has a textual description of "You had more returning customers than last year! Good work, your business is trending up!". As a further example, if "RC1" is equal to "RC2", the server will map the result for returning customers to insight element 324, which has a textual description of "You had the same amount of returning customers this year as last year, showing your customer retention is stable.". As yet another example, if "RC1" is less than "RC2", the server will map the result for returning customers to the insight element 326, which has a textual description of "You had fewer returning customers than last year. Unless you have more new customers, you should focus on retaining your customers.".

Similarly, the server may map other results to separate insights based on other operators. One or more metadata elements associated with result topics (e.g., metadata elements 208a-208q of FIG. 2B) may be used in organizing and applying rules to results, such as TI, E, P, and TC (as shown by metadata elements 208c, 208d, 208e, and 208f of FIG. 2B) indicating that values for taxable income, expenses, profit, and total customers from leaves of the tree (e.g., 206c, 206d, 206e, and 206f of FIG. 2B) should be used as shown in rules 314-320. For example, metadata elements 208c, 208d, and 208e indicate that the values of leaves 206c, 206d, and 206e should be used when applying rule 314, and metadata elements 208c and 208d indicate that the value of leaves 206c and 206d should be used when applying rule 316. For further example, the metadata elements 208c, 208d, and 208f may indicate that the values of leave 206c, 206d, and 206f should be used when applying rules 318 and 320.

While insight topics 302-306 are shown, they are only exemplary insight topics, and other insight topics may be used. Further, while rules 308-320 are shown, they are only exemplary, and many more rules may be used by server. Even further, while only two or three rules are shown for each insight topic for simplicity, it should be noted that many more rules may be available for each insight topic. Further yet, while insight elements 322-334 are shown, they are only exemplary insight elements, and more insight elements may be used by server.

In this example, applying the rules 308-320 allows the results to be mapped to insight elements 326, 328, and 332 to create a set of insight elements 336 that will be later delivered to insight generation model 116.

Further, in this example, the set of insight elements 336 is first delivered to ranking model 146 to order the insight elements 326, 328, and 336 in the set before sending the set to the insight generation model. Rankings for the insight elements may be determined based on particular probabilities determined from user data associated with each insight element. Examples of such probabilities may be associated with how users interact with insights including the insight element, such as a probability of being clicked for more information, a probability of being liked if asked, or a probability of being agreed as accurate if asked. The ranking model may be a regression model, such as an XGBoost regression model, may be used to calculate a ranking score for each insight based on the probabilities associated with each insight element. The ranking scores for each insight element may be used to order the insight elements 326, 328, and 332 in the set of insight elements.

Additionally, the ranking model 146 may use other information associated with the insight elements to produce the ranking scores. In one embodiment, the ranking score may be further based on a population coverage percentage and a category. For example, each insight may be associated with a particular population coverage, meaning that the insight has been provided to a certain percentage of users because a result may be mapped to that insight element for fifty percent (50%) of all documents. The regression model may also use that population coverage in determining the ranking score. Additionally, a category, such as good, bad, or neutral may also be assigned to each insight. Each category may be associated with a numerical value, which may also be used by the regression model in determining a score for each insight element.

In this depicted example, insight generation model 116 receives the set of insight elements 336 in the order determined by the ranking model and may generate an insight 338 based on the set of insight elements. The server may then return the insight 338 to a computing device (e.g., computing device 140 of FIG. 1) associated with a user who requested an insight for the document.

In some cases, the insight generation model 116 may be trained on the server. The insight generation model 116 may be trained to generate an insight when receiving a set of insight elements associated with a tree as input by using Natural Language Processing (NLP) methods. In one embodiment, the insight generation model 116 may be a BERT model, a GPT-2 model, or a GPT-3 model. The insight generation model 116 may be trained to output an insight when receiving a set of insight elements as input by using known insights associated with sets of insight elements as training data. In some cases, training the insight generation model 116 further consists of removing certain words of the known insight and allowing the insight generation model 116 to fill in the best guess of the removed words during a training instance.

In some embodiments, the insight generation model 116 may be trained to output an insight where the wording of each insight element remains unchanged. In other cases, the insight generation model 116 may use NLP to construct the insight by combining the set of insight elements 336 into an insight, including by adding words and punctuation. Additionally, the insight generation model 116 may combine two or more insight elements that have similar insight topics by amending parts of each insight element to fit together. Even further, the insight generation model 116 may summarize the entirety of the set of insight elements 336 to create a more compact insight.

Example Vector for Set of Insight Elements and Health Score for Document

Figure 4:
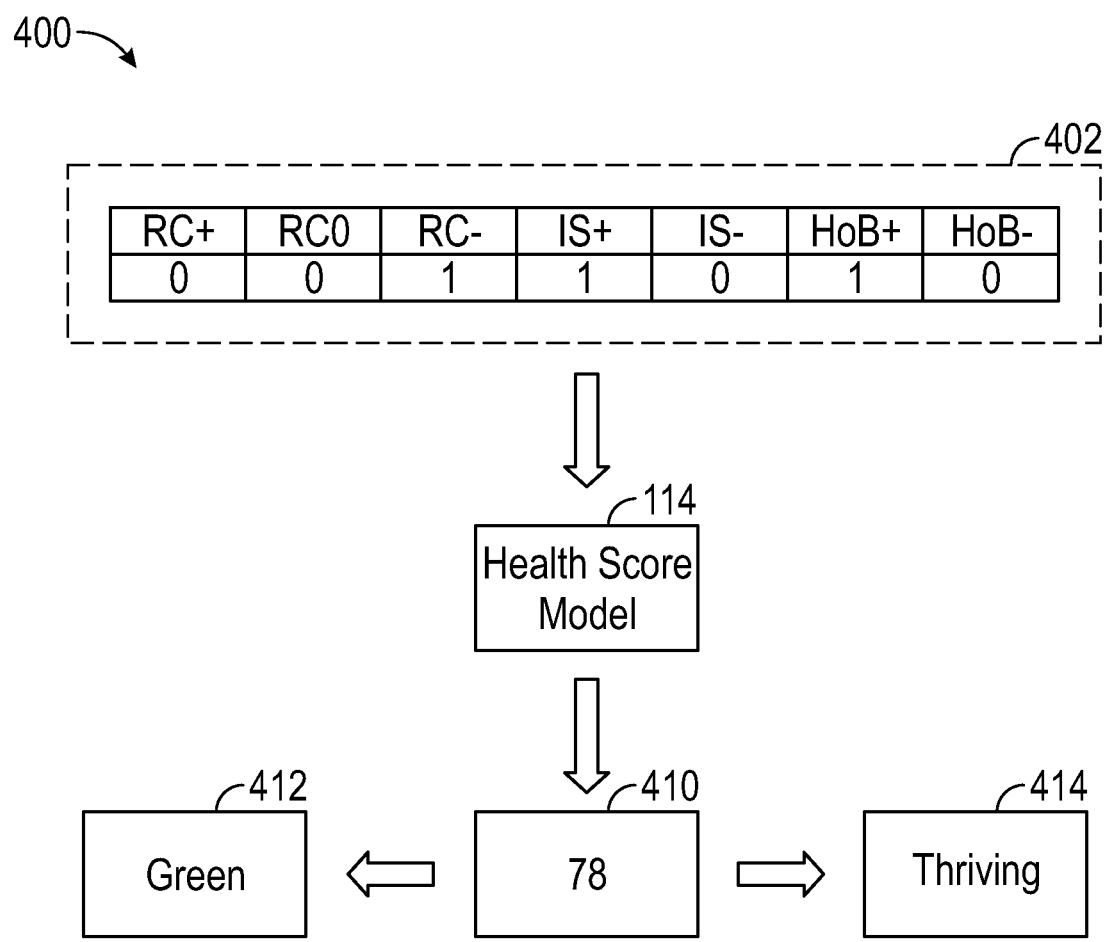
FIG. 4 depicts an example process of calculating a health score for a document based on a set of insight elements.

FIG. 4 depicts an example processing 400 of vector 402 associated with a set of insight elements, such as set of insight elements 336 of FIG. 3, to generate a health score 410 for an document based on the set of insight elements.

As described with respect to FIG. 1, one or more documents may be received by a server, such as server 102. The documents may be converted into trees containing information about the documents, which may be parsed in order to obtain one or more results associated with each tree. The results for each tree may be mapped to a set of insight elements for the tree.

As depicted in this example, vector 402 is based on the set of insight elements 336 out of all insight elements 322-334, as described with respect to FIG. 3. As illustrated, vector 402 has a dimension for each possible insight element that could have been mapped (e.g., one dimension for each of insight elements 322-334). Further, dimensions associated with insight elements present in the set of insight elements for the tree (e.g., insight elements 326, 328, and 332) have a "1" value, while dimensions associated with insight elements that are not present in the set of insight elements for the tree (e.g., insight elements 322-324, 330, and 334) have a "0" value. While seven dimensions are shown, it should be noted that seven dimensions is exemplary, and more or fewer dimensions may be used, depending on how many possible insights may be mapped.

As depicted, health score model 114 receives vector 402 and generates a health score 410 for a document based on the vector 402. In one embodiment, the health score model 114 may be an XGBoost regression model, a linear regression model, or a decision-tree regression model. The health score model 114 generates the health score based on which insights are present in the set of insight elements as well as insights that are not present in the set of insight elements associated with the vector 402.

The health score for a document may comprise a score in between "0" and "100" representing a probability that an associated organization will be in operation during a specific time period in the future. For example, the health score may be "80" if health score model 114 predicts the probability that an organization associated with the document has an 80% chance of still being in operation after six months from receiving the document. In some embodiments, the health score may further be associated with other indications of whether the organization will be operating during the specific time period, such as a color (e.g., "green") representing the likelihood that the organization will be operating. Further, a health score may be associated with one or more specific words indicating the likelihood of whether the organization will be operating during the specific time period, such as "unhealthy", "healthy", or "thriving".

For example, health score 410 has a score of 78, indicating a 78% chance of the associated organization still operating during the specified future time period. Additionally, health color 412 may be associated with a certain range of health scores (e.g., green may be associated with a range of 75-100). Further, health indicator 414 may also be associated with a certain range of health scores (e.g., "thriving" may be associated with a range of 70-100). These various means of representing the health score may be useful for various user interfaces in which it is depicted, such as on computers, mobile devices, and the like.

After generating the health score 410 based off the vector 402, the health score model 114 may return the health score 410 along with any associated information to the server. The server may later return the health score 410 along with any associated information to a user in response to a request for the health score.

In some embodiments, the health score model 114 may be trained on the server by labelling sets of insight elements associated with trees with historical health scores. The server may create a vector based on each set of insight elements associated with each tree and the entire set of insight elements stored on the server (e.g., in insights 130 of FIG. 1). Similarly to vector 402, each vector used to train the health score model 114 may be binary, where a dimension for an insight element present in the set of insight elements may be labeled with a value of "1", and where a dimension for an insight element not present in the set of insight elements may be labeled with a value of "0".

The historical health score may indicate if an organization associated with the certain document and tree was still in operation during a certain time period after the document was received, such as six months after receiving the document. In some cases, the historical health score for each organization associated with the documents may be received from a computing device, such as computing device 144. In other cases, the server may access a network to determine if each organization was still operating during the certain time period.

In one embodiment, the historical health scores, which may be used as labels for training health score model 114, may be binary, where a historical health score is "0" if the organization associated with the document was not operating during the certain time period and the historical health score is "1" if the organization associated with the document was operating during the certain time period.

In some embodiments, the historical health score may not be binary, and may represent a probability of if the organization associated with the document was in operation within the time period. For example, the historical health score may be "0.25" if it cannot be determined that the organization was operating during the certain time period, but circumstances surrounding the organization indicate that the organization was likely not operating. As another example, the historical health score may be "0.75" if, again, it cannot be determined that the organization was operating during the certain time, but circumstances surrounding the organization indicate that the organization was likely operating. Additionally, while an example of six months prior to receiving the document is given for the certain time period, many different time periods may be used.

Example Analysis Containing Insight and Health Score

Figure 5:
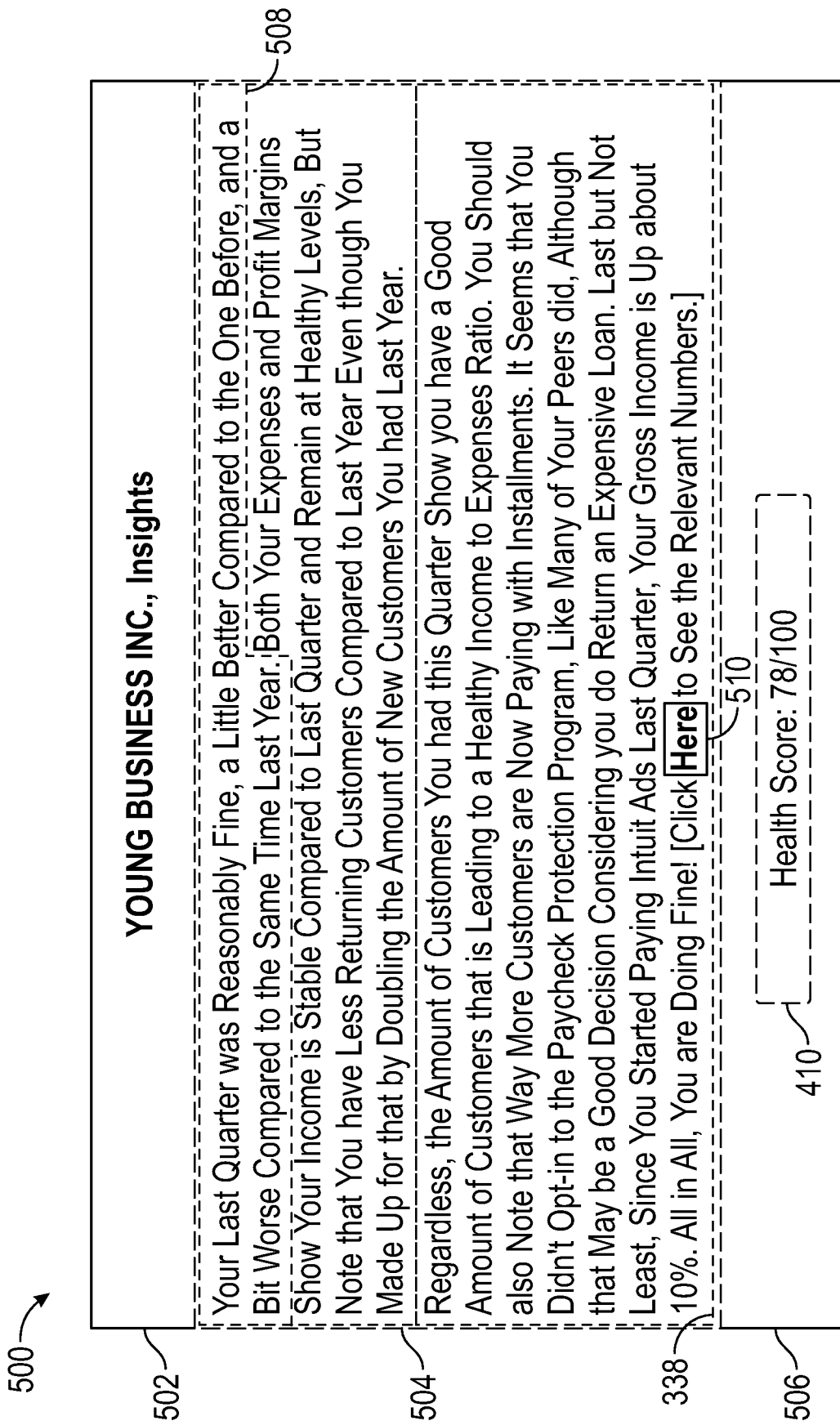
FIG. 5 depicts an example analysis containing an insight and a health score based on a document.

FIG. 5 shows example analysis 500 containing an insight 338 and health score 410 based on a document (e.g., document 200 of FIG. 2A) that is returned to a user based on a request to generate an insight and a health score. In some cases, the analysis may be based on multiple documents.

As described with respect to FIGS. 3-4, a set of insight elements, such as set of insight elements 336 of FIG. 3, are mapped from results of parsing a tree, such as tree 204 of FIG. 2B. The set of insight elements are input to a health score model and/or an insight generation model, such as health score model 114 of FIGS. 1 and 4 and insight generation model 116 of FIGS. 1 and 3, in order to generate a health score 410 and insight 338. In some cases, the health score model may receive the set of insight elements as a vector representation, such as in FIG. 4.

Analysis 500 displays one or more characteristics of an organization associated with the document, such as the name of the organization (e.g., "Young Business, Inc."), in characteristic portion 502. The one or more characteristics may be based on information extracted from a tree associated with the document.

Analysis 500 further displays insight portion 504 that includes an insight 338 for a document created from the set of insight elements associated with the tree. Insight 338 may be generated by an insight generation model based on natural language processing techniques. In this depicted example, insight 338 may include one or more sentences created based on the textual descriptions of the insight elements of the set of insight elements for the tree. In some cases, insight 338 includes words and punctuation generated by the insight generation model in order to stitch the insight elements together. Additionally, insight 338 may include sentences that combine one or more insights. For example, insight sentence 508 may be based on two or more insight elements, such as insight elements 326 and 328 of FIG. 3 as well as other possible insight elements that were combined, rearranged, and/or summarized by insight generation model 116.

In this example, the insight 338 is in the form of a paragraph based on the textual descriptions of the set of insight elements associated with the tree. In other embodiments, the insight 338 may be multiple separate sentences or paragraphs constructed from the insight elements and accompanying descriptions of the rules that mapped the results to the insight elements. In one embodiment, the insight 338 may be multiple links leading to the textual descriptions of insight elements of the set of insight elements and the calculations that led to mapping those insight elements.

In the depicted example, insight 338 further includes a display of one or more relevant calculations that the server calculated in mapping the set of insight elements that may be accessed by selecting a link 510 in the insight. In some embodiments, the link 510 may not be present in the insight 338.

Analysis 500 further includes a health score portion 506 containing a health score 410 for an organization associated with the document. The health score 410 may be generated by the health score model (e.g., 114 of FIGS. 1 and 4). In some embodiments, health score portion 506 may further include other information associated with the health score 410 that is derived from the set of insight elements, such as a color indicating the health of the organization (e.g., health color 412 of FIG. 4) or a word indicating the health of the organization (e.g., health indicator 414 of FIG. 4).

Thus, the analysis 500 may be returned to a user who requested an insight and a health score based on a document associated with a particular organization. In some embodiments, analysis 500 may contain any of characteristics portion 502, insight portion 504, and health score portion 506 alone or in combination.

Example Process of Training Models and
Generating Insights and Health Scores

Figure 6:
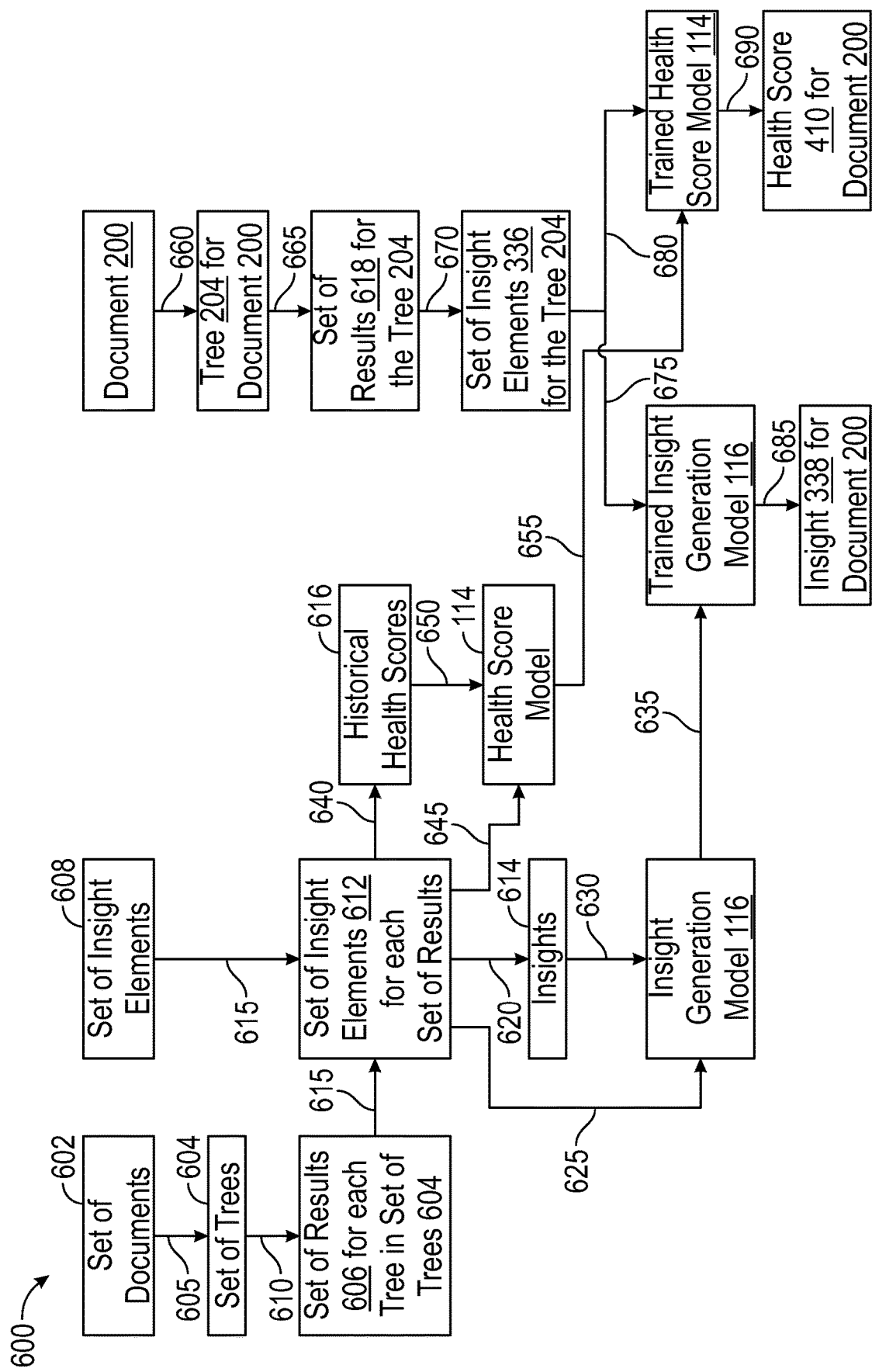
FIG. 6 depicts an example process flow for automatically generating an insight and a health score for a document.

FIG. 6 depicts example process 600 generating an insight 338 and a health score 410 for a document 200. In some embodiments, process 600 may be performed by a server, such as server 102 of FIG. 1.

At step 605, after receiving a set of documents 602, the set of documents 602 is converted into a set of trees into set of tree trees 604 (e.g., with conversion component 120 of FIG. 1). In some embodiments, the documents may be historical documents. Each tree converted from a document may contain one or more descriptions and one or more values associated with fields within the document (e.g., in leaves 206a-206q of FIG. 2B). The server may use multiple methods of converting a document into a tree, such as, but not limited to, using one or more recursive functions to construct a tree from a document with one or more tabular fields.

At step 610, the set of trees 604 are parsed to generate a set of results 606 for each tree of set of trees 604 (e.g., with parsing component 122 of FIG. 1). As described above, the parsing component may apply rules in order to parse the one or more trees, where the rules are associated with the set of trees 604 and are received from a computing device (e.g., computing device 142 of FIG. 1) or defined on the server. Parsing the one or more trees in set of trees 604 may include retrieving the one or more descriptions and one or more values associated with the fields within a document and analyzing the descriptions and values. The one or more descriptions and one or more values may further be manipulated into a different set of descriptions and values. The parsing component may also compare values between two or more trees in order to determine new values based on the values of the two or more trees. Each tree may be associated with an organization, and in some cases, more than one document may be associated with the same organization.

At step 615, the sets of results 606 are mapped to sets of insight elements 612 (e.g., at mapping component 124 of FIG. 1). The sets of insight elements 612 may be determined from a set of insight elements 608 that contains all possible insight elements. In some embodiments, each set of insight elements 612 may be a subset of set of insight elements 608. The insight elements may be received from a computing device, such as computing device 142 of FIG. 1, or may already be stored on the server (e.g., in insights 130 of FIG. 1).

Each insight element may be related to one or more rules so that an insight element may be determined based on the results of applying the related one or more rules. Further, each insight element may contain a textual description of the result in a short explanation. For example, if the parsing component, by executing certain rules, determines that a document from 2019 shows an organization had one thousand (1,000) customers, and later determines that a document from 2020 shows the same organization had two thousand (2,000) customers, the parsing component might return a result of 1,000 related to the organization's new customers. Afterwards, the mapping component receives and further applies rules to the results to determine a particular insight element related to the result, which may contain a short textual description of the result, such as "Your business served double the amount customers this year than it did last year!" or "Your business served more customers than it did last year, so business is trending up." Further, in some cases, more than one result may be used to determine one insight element. In some cases, not all results may be mapped to a specific insight element.

The results of parsing multiple trees or the results of parsing a single tree may be used in order to determine the insight elements for one specific tree. For example, the mapping component may compare the result of parsing a first tree to the result of parsing a second tree in mapping one insight for the tree, but may also only use the results of parsing the first tree in mapping another insight for the tree. In one embodiment, the document analyzer may only use the results of parsing the single tree.

At step 620, an insight is created for each set of insight elements 612 to create insights 614.

In the depicted example, at steps 625 and 630, the sets of insight elements 612 and the insights 614 are sent to insight generation model 116. At step 635, the insight generation model 116 may then be trained according to FIGS. 1 and 3 to generate an insight when receiving a set of insight elements as input. The insight generation model 116 is trained by labelling each set of insight elements 612 with an insight of insights 614 and using the pair of the set of insight elements and the insight as a training instance. The trained insight generation model 116 may receive a set of insight elements as input and determine an optimal way to combine, amend, or summarize the textual explanations for each insight element to create an understandable and compact insight.

In some embodiments, the server may limit the amount or topics of insights that may be present in the insight for a document. For example, the server may only use a specified amount of insight elements to generate input to insight generation model 116. For example, a specified amount of insight elements may be specified by a user. In some embodiments, the insight generation model 116 may only include insight elements associated with one or more particular insight topics (e.g., "customers" or "income") that may be related to metadata in a tree in a generated insight. The one or more types of insight elements may be specified by a user.

At step 640, a historical health score 616 for each set of insight elements 612 is determined based on whether or not an organization associated with a corresponding tree was operating during a certain time period.

At steps 645 and 650, the sets of insight elements 612 and the corresponding historical health scores 616 are sent to a health score model 114. At step 655, the health score model 114 may then be trained to generate a health score when receiving a set of insight elements as input. In this example, training the health score model 114 includes labelling each set of insight elements of set of insight element 612 with a historical health score 616 and using each set of insight elements and corresponding historical health score as a training instance.

At step 660, the document 200 is converted into a tree 204 (e.g., at conversion component 120 of FIG. 1).

At step 665, the tree 204 is parsed with the rules to obtain a set of results 618 for the tree 204. Similarly to parsing the set of trees 604, the tree 204 may be parsed by comparing one or more values from the tree to one or more values from other trees. The tree 204 may further be parsed by comparing values within just the tree 204.

At step 670, the set of results 618 is mapped to a set of insight elements 336 (e.g., at mapping component 124 of FIG. 1).

At step 675, the server provides the set of insight elements 336 to the trained insight generation model 116 in order to generate an insight 338. In some embodiments, the set of insight elements 336 may be provided in an order determined by a ranking model, such as ranking model 146 of FIG. 1. Similarly, at step 680, the server may provide the set of insight elements 336 to the trained health score model 114 in order to generate a health score 410.

At step 685, the insight 338 is generated for the document 200 (e.g., at insight component 106 of FIG. 1).

Finally, at step 690, the health score 410 is generated for the document 200 (e.g., at health score component 104 of FIG. 1). The server may provide both the insight 338 and the health score 410 to a computing device (e.g., computing device 140 of FIG. 1), for example, based on a request of the user from the computing device.

Example Method of Generating an Insight and Health Score

Figure 7:
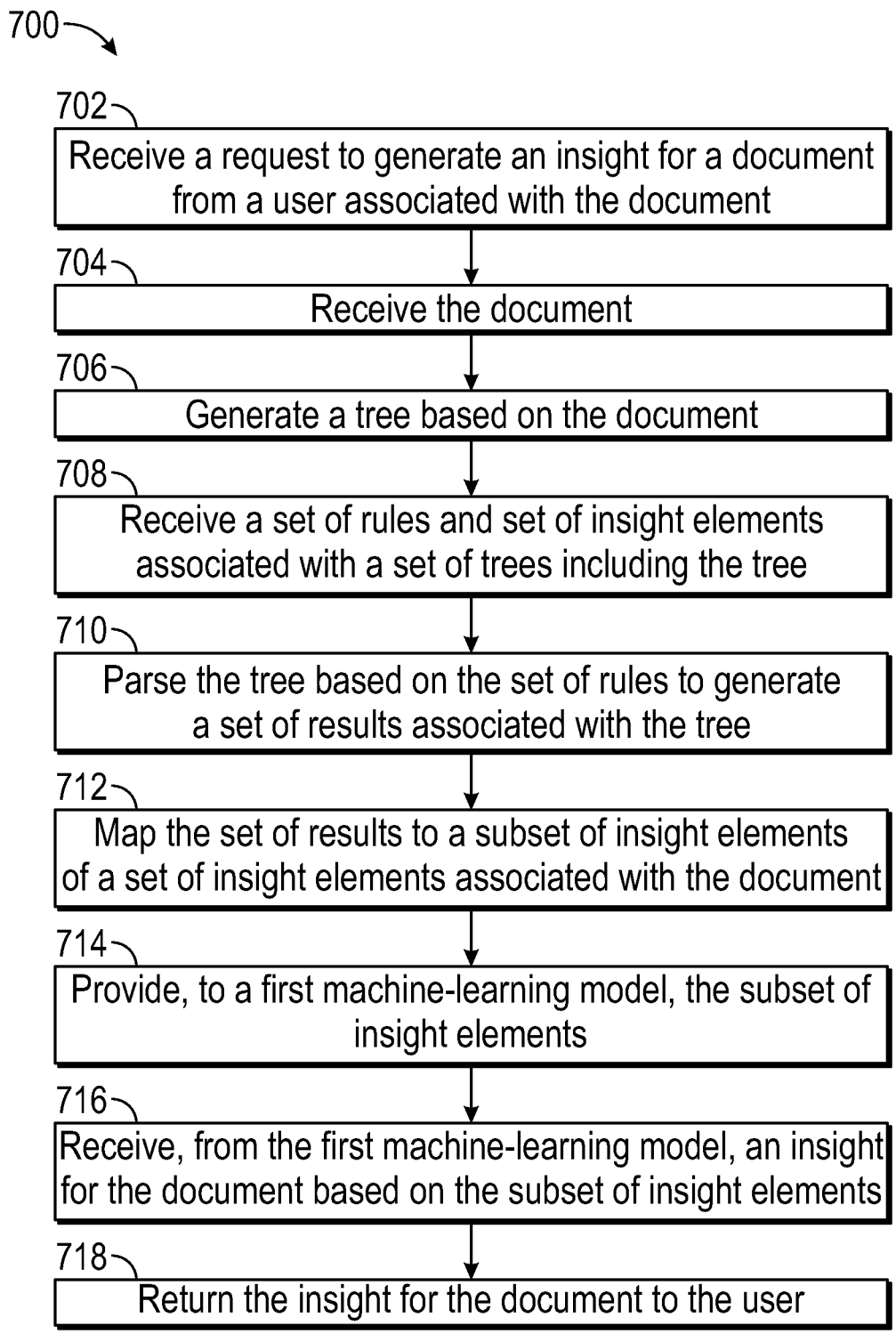
FIG. 7 depicts an example method of generating an insight using a trained model.

FIG. 7 depicts an example method 700 of generating an insight, such as described above with respect to FIGS. 1-6. In some embodiments, method 700 may be performed by a processing system, such as server 102 in FIG. 1.

Method 700 begins at step 702 with receiving a request to generate an insight for a document, such as document 200 of FIG. 2A, from a user associated with the document. The request may be sent by a computing device associated with the user, such as computing device 140 of FIG. 1. The document may be associated with an organization.

Method 700 then proceeds to step 704 with receiving the document from the computing device.

Method 700 then proceeds to step 706 with generating a tree, such as tree 204 of FIGS. 2B and 6, based on document (e.g., by using conversion component 120 of FIG. 1).

Method 700 then proceeds to step 708, with receiving a set of rules and set of insight elements associated with a set of trees including the tree. In some embodiments, the set of trees may include the set of trees 604 of FIG. 6. In one embodiment, the set of trees may be converted from historical documents. In another embodiment, the set of rules and set of insight elements may be received from a computing device associated with an expert associated with the historical documents (e.g., computing device 142 of FIG. 1). In yet another embodiment, the set of rules and set of insight elements may be defined on a server (e.g., server 102 of FIG. 1). The set of rules and set of insight elements may be stored on the server (e.g., at rules 128 and insights 130 of FIG. 1, respectively).

Method 700 then proceeds to step 710 with parsing the tree based on the set of rules to generate a set of results, such as the set of results 618 of FIG. 6, associated with the tree.

Method 700 then proceeds to step 712 with mapping the set of results to a subset of insight elements associated with the document, such as set of insight elements 336 of FIGS. 3 and 6. The server may map the results to the subset of insight elements by applying rules to the set of results in order to map each specific result to a specific insight element of a set of all possible insight elements (e.g., set of insight elements 608 of FIG. 6).

Method 700 then proceeds to step 714 with providing the subset of insight elements to a first machine-learning model (e.g., insight generation model 116 of FIGS. 1, 3, and 6), which may be trained to generate an insight, such as insight 338 of FIGS. 3, 5, and 6 when receiving a subset of insight elements as input. In some embodiments, the subset of insight elements may also be provided to a second machine-learning model (e.g., health score model 114 of FIGS. 1, 4, and 6), which may be trained to generate a health score, such as health score 410 of FIGS. 4, 5, and 6 when receiving a subset of insight elements as input. The health score may indicate a probability that an organization associated with the document will be operating during a certain future time period. In some embodiments, the subset of insight elements may be provided to the first machine-learning model in an order based on ranking scores determined by a third machine-learning model for each insight element according to one or more criteria.

In some embodiments, the method 700 may include training the various machine-learning models. A set of documents associated with the set of insight elements may be received and converted into a set of trees representing the documents. The documents may be historical. The set of trees may be parsed to obtain a set of results for each tree in the set of trees, where each set of results may be mapped to a respective set of insight elements. An insight may be determined for each historical document based on the respective set of insight elements, and each pair of the insight and the respective set of insight elements may be used as a training instance in training the first machine-learning model to output an insight when receiving a set of insight elements as input. Similarly, each respective set of insight elements may be labeled with a historical health score based on whether an organization associated with a historical document was operating during a certain time period, and each pair of a historical health score and a respective set of insight elements may be used as a training instance in training the second machine-learning model to output a health score when receiving a set of insight elements as input.

Method 700 then proceeds to step 716 with receiving the insight for the document from the first machine-learning model.

Method 700 then proceeds to step 718 with returning the insight for the document to the user. The insight may be returned by being sent to the computing device associated with the user, such as computing device 140. In some embodiments, if a health score was generated for the document, the health score may be returned to the computing device associated with the user, alone or in combination with the insight.

Example Processing Device

Figure 8:
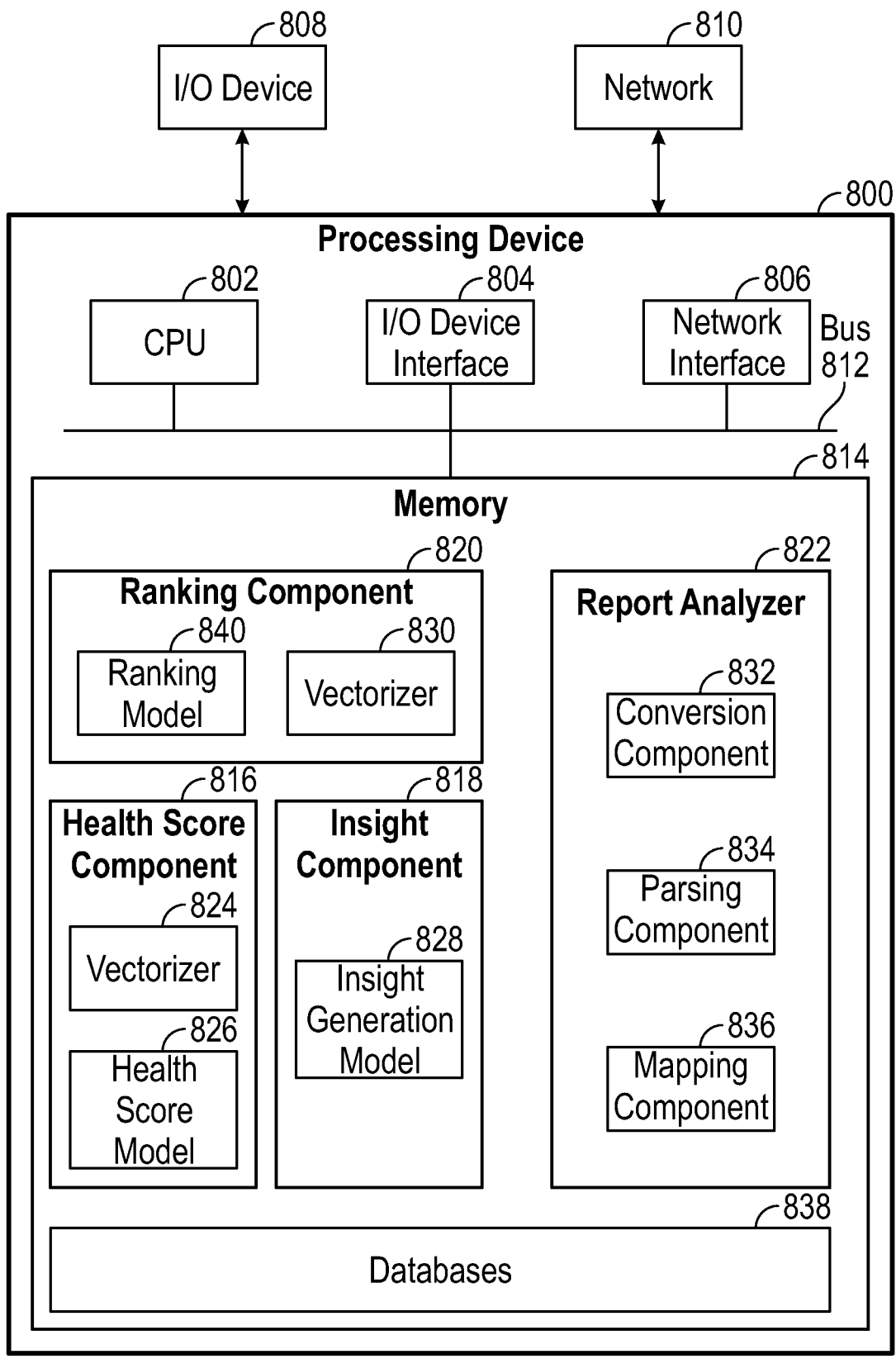
FIG. 8 depicts an example processing device that may be configured to perform the methods described herein.

FIG. 8 depicts an example processing device 800 that may be configured to perform the methods described herein, such as method 700 described with respect to FIG. 7. In various embodiments, the processing device 800 can be a physical processing device, while in other embodiments, the processing device may be a virtual (e.g., cloud) processing device (e.g., a virtual machine operating in a cloud service infrastructure).

In this example, processing device 800 includes a central processing unit (CPU) 802 connected to a data bus 812. CPU 802 is configured to process computer-executable instructions, e.g., stored in memory 814, and to cause the processing device 800 to perform methods described herein, for example, with respect to FIG. 7. CPU 802 is included to be representative of a single CPU, multiple CPUs, a single CPU having multiple processing cores, and other forms of processing architecture capable of executing computer-executable instructions.

Processing device 800 further includes input/output (I/O) device(s) 808 and I/O device interfaces 804, which allows processing device 800 to interface with input/output devices 808, such as, for example, keyboards, displays, mouse devices, pen input, and other devices that allow for interaction with processing device 800. Note that processing device 800 may connect with external I/O devices through physical and wireless connections (e.g., an external display device).

Processing device 800 further includes a network interface 806, which provides processing device 800 with access to external network 810 and thereby external personal devices, such as computing devices 140, 142, and 144 of FIG. 1.

Processing device 800 further includes memory 814, which in this example includes a health score component 816, an insight component 818, a ranking component 820, a document analyzer 822, and databases 838.

In the depicted example, document analyzer 822 further includes conversion component 832, parsing component 834, and mapping component 836. Conversion component 832 converts documents (e.g., set of documents 602 of FIG. 6 and document 200 of FIGS. 2A and 6) received at the processing device 800 into trees (e.g., set of trees 604 of FIG. 6 and tree 204 of FIGS. 2B and 6). Further, parsing component 834 parses one or more trees in order to determine results (e.g., set of results 606 and set of results 618 of FIG. 6) associated with those trees by applying rules to values in the trees. Mapping component 836 maps the results to insights received at the processing device 800 by applying one or more rules to the results. Mapping component 836 may then gather the mapped insights into a subset of insight elements (e.g., sets of insight elements 612 of FIG. 6 or set of insight elements 336 of FIGS. 3 and 6) associated with the document.

Health score component 816 further includes vectorizer 824 and health score model 826. Vectorizer 824 converts a set of insight elements associated with a tree into a vector, where each dimension corresponds to a specific insight in a larger set of insight elements. Health score model 826 may receive the vector created from the set of insight elements and output a health score based on the vector.

Insight component 818 further includes an insight generation model 828. Insight generation model 828 may be trained to receive a set of insight elements and generate an insight as output. Insight generation model 828 may further modify, combine, or summarize insights in the set of insight elements while generating the insight.

In this depicted example, ranking component 820 furthers include a vectorizer 830, which may create a vector for each insight based on probabilities associated with that insight, and ranking model 840, which may calculate a ranking score for each insight element in a set of insight elements. The ranking component 820 may then order the insights in a set of insight elements based on ranking scores calculated based on the vector for each insight.

Alternatively, the ranking component may rank the insights based on an importance score received from an external computing device (e.g., computing device 142 of FIG. 1) without the use of a machine-learning model.

Databases 838 may store various files and data for the processing device 800. For example, databases may store all received documents in one database, while also storing all rules, insights, trees, health scores, and ranking in their own respective databases.

Note that while shown as a single memory 814 in FIG. 8 for simplicity, the various aspects stored in memory 814 may be stored in different physical memories, but all accessible by CPU 802 via internal data connections such as bus 812. While not depicted, other aspects may be included in memory 814.

Example Clauses

Implementation examples are described in the following numbered clauses:

Clause 1: A method for generating an insight, comprising: receiving a request to generate an insight for a document from a user associated with the document; receiving the document; generating a tree based on the document; parsing the tree based on a set of rules to generate a set of results associated with the tree; mapping the set of results to a subset of insight elements of a set of insight elements associated with a set of trees including the tree; providing, to a first machine-learning model, the subset of insight elements; receiving, from the first machine-learning model, an insight for the document based on the subset of insight elements; and returning the insight for the document to the user.

Clause 2: The method of Clause 1, further comprising: providing, to a second machine-learning model, the subset of insight elements; receiving, from the second machine-learning model, a health score for the document; and returning the health score for the document to the user.

Clause 3: The method of any one of Clauses 1-2, further comprising: determining a ranking score for each insight element in the subset of insight elements according to one or more criteria; and ordering the insight elements of the subset of insight elements based on the ranking score for each insight element, wherein providing the subset of insight elements to the first machine-learning model comprises providing the subset of insight elements based on the ordering.

Clause 4: The method of Clause 2, wherein the document is associated with an organization, wherein the health score for the document indicates a probability of the organization being in operation during a time period.

Clause 5: The method of any one of Clauses 2-4, further comprising: receiving the set of rules and the set of insight elements associated with the set of trees including the tree; receiving a set of historical documents associated with the set of insight elements; converting the set of historical documents into a set of historical trees, wherein the set of trees further comprises the set of historical trees; parsing the set of historical trees to obtain a set of historical results for each historical tree; mapping each set of historical results to a respective subset of insight elements; determining an insight for each historical document based on the respective subset of insight elements for each set of historical results; training the first machine-learning model based on the respective subset of insight elements for each historical tree and the determined insight for each historical document; labeling the respective subset of insight elements for each set of historical results with a historical health score; and training the second machine-learning model to generate a health score based on each respective subset of insight elements.

Clause 6: The method of Clause 5, labeling each subset of insight elements for each set of historical results with a historical health score is based on whether an organization associated with each historical document was operating during a first time period; and the health score for the document indicates a probability that an organization associated with the document will be operating after a second time period.

Clause 7: The method of any one of Clauses 5-6, wherein receiving the set of rules and the set of insight elements comprises receiving the set of rules and set of insight elements from a computing device associated with an expert associated with the set of historical documents.

Clause 8: A processing system, comprising: a memory comprising computer-executable instructions; one or more processors configured to execute the computer-executable instructions and cause the processing system to perform a method in accordance with any one of Clauses 1-7.

Clause 9: A processing system, comprising means for performing a method in accordance with any one of Clauses 1-7.

Clause 10: A non-transitory computer-readable medium comprising computer-executable instructions that, when executed by one or more processors of a processing system, cause the processing system to perform a method in accordance with any one of Clauses 1-7.

Clause 11: A computer program product embodied on a computer-readable storage medium comprising code for performing a method in accordance with any one of Clauses 1-7.

Other Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for generating an insight, comprising:
receiving a set of rules and a set of insight elements associated with a set of trees;
receiving a set of historical documents associated with the set of insight elements;
converting the set of historical documents into a set of historical trees, wherein the set of trees further comprises the set of historical trees;
parsing the set of historical trees to obtain a set of historical results for each historical tree;
mapping each set of historical results to a respective subset of the set of insight elements;
determining an insight for each historical document based on the respective subset of the set of insight elements for each set of historical results;
training a first machine-learning model based on the respective subset of the set of insight elements for each historical tree and the determined insight for each historical document;
labeling the respective subset of the set of insight elements for each set of historical results with a historical health score,
training a second machine-learning model, based on each respective subset of the set of insight elements, to generate health scores;
receiving a request to generate an insight for a document from a user associated with the document;
receiving the document;
generating a tree of the set of trees based on the document;
parsing the tree based on the set of rules to generate a set of results associated with the tree;
mapping the set of results to a given subset of the set of insight elements;
providing, to the first machine-learning model, the given subset of the set of insight elements;
receiving, from the first machine-learning model, an insight for the document based on the given subset of the set of insight elements;
returning the insight for the document to the user;
providing, to the second machine-learning model, the given subset of the set of insight elements;
receiving, from the second machine-learning model, a health score for the document; and
returning the health score for the document to the user.

2. The method of claim 1, further comprising:
determining a ranking score for each insight element in the given subset of the set of insight elements according to one or more criteria; and
ordering the insight elements of the given subset of the set of insight elements based on the ranking score for each insight element, wherein providing the given subset of the set of insight elements to the first machine-learning model comprises providing the given subset of the set of insight elements based on the ordering.

3. The method of claim 1, wherein the document is associated with an organization, wherein the health score for the document indicates a probability of the organization being in operation during a time period.

4. The method of claim 1, wherein:
labeling each subset of insight elements for each set of historical results with a historical health score is based on whether an organization associated with each historical document was operating during a first time period; and
the health score for the document indicates a probability that an organization associated with the document will be operating after a second time period.

5. The method of claim 1, wherein receiving the set of rules and the set of insight elements comprises receiving the set of rules and set of insight elements from a computing device associated with an expert associated with the set of historical documents.

6. A system comprising:
a processor; and
a memory storing instructions, which when executed by the processor perform a method for generating an insight, comprising:
receiving a set of rules and a set of insight elements associated with a set of trees;
receiving a set of historical documents associated with the set of insight elements;
converting the set of historical documents into a set of historical trees, wherein the set of trees further comprises the set of historical trees;
parsing the set of historical trees to obtain a set of historical results for each historical tree;
mapping each set of historical results to a respective subset of the set of insight elements;
determining an insight for each historical document based on the respective subset of the set of insight elements for each set of historical results;
training a first machine-learning model based on the respective subset of the set of insight elements for each historical tree and the determined insight for each historical document;

labeling the respective subset of the set of insight elements for each set of historical results with a historical health score, training a second machine-learning model, based on each respective subset of the set of insight elements, to generate health scores;

receiving a request to generate an insight for a document from a user associated with the document;

receiving the document;

generating a tree of the set of trees based on the document;

parsing the tree based on the set of rules to generate a set of results associated with the tree;

mapping the set of results to a given subset of the set of insight elements;

providing, to the first machine-learning model, the given subset of the set of insight elements;

receiving, from the first machine-learning model, an insight for the document based on the given subset of the set of insight elements;

returning the insight for the document to the user;

providing, to the second machine-learning model, the given subset of the set of insight elements;

receiving, from the second machine-learning model, a health score for the document; and returning the health score for the document to the user.

7. The system of claim 6, the method further comprising:

determining a ranking score for each insight element in the given subset of the set of insight elements according to one or more criteria; and ordering the insight elements of the given subset of the set of insight elements based on the ranking score for each insight element, wherein providing the given subset of the set of insight elements to the first machine-learning model comprises providing the given subset of the set of insight elements based on the ordering.

8. The system of claim 6, wherein the document is associated with an organization, wherein the health score for the document indicates a probability of the organization being in operation during a time period.

9. The system of claim 6, wherein:

labeling each subset of insight elements for each set of historical results with a historical health score is based on whether an organization associated with each historical document was operating during a first time period; and the health score for the document indicates a probability that an organization associated with the document will be operating after a second time period.

10. The system of claim 6, wherein receiving the set of rules and the set of insight elements comprises receiving the set of rules and set of insight elements from a computing device associated with an expert associated with the set of historical documents.

11. A non-transitory computer-readable medium comprising instructions that, when executed by a processor of a processing system, cause the processing system to perform a method for generating an insight, comprising:

receiving a set of rules and a set of insight elements associated with a set of trees;

receiving a set of historical documents associated with the set of insight elements;

converting the set of historical documents into a set of historical trees, wherein the set of trees further comprises the set of historical trees;

parsing the set of historical trees to obtain a set of historical results for each historical tree;

mapping each set of historical results to a respective subset of the set of insight elements;

determining an insight for each historical document based on the respective subset of the set of insight elements for each set of historical results;

training a first machine-learning model based on the respective subset of the set of insight elements for each historical tree and the determined insight for each historical document;

labeling the respective subset of the set of insight elements for each set of historical results with a historical health score;

training a second machine-learning model, based on each respective subset of the set of insight elements, to generate health scores;

receiving a request to generate an insight for a document from a user associated with the document;

receiving the document;

generating a tree of the set of trees based on the document;

parsing the tree based on the set of rules to generate a set of results associated with the tree;

mapping the set of results to a given subset of the set of insight elements;

providing, to the first machine-learning model, the given subset of the set of insight elements;

receiving, from the first machine-learning model, an insight for the document based on the given subset of the set of insight elements;

returning the insight for the document to the user;

providing, to the second machine-learning model, the given subset of the set of insight elements;

receiving, from the second machine-learning model, a health score for the document; and returning the health score for the document to the user.

12. The non-transitory computer-readable medium of claim the method further comprising:

determining a ranking score for each insight element in the given subset of the set of insight elements according to one or more criteria; and ordering the insight elements of the given subset of the set of insight elements based on the ranking score for each insight element, wherein providing the given subset of the set of insight elements to the first machine-learning model comprises providing the given subset of the set of insight elements based on the ordering.

13. The non-transitory computer-readable medium of claim 11, wherein the document is associated with an organization, wherein the health score for the document indicates a probability of the organization being in operation during a time period.

14. The non-transitory computer-readable medium of claim 11, wherein:

labeling each subset of insight elements for each set of historical results with a historical health score is based on whether an organization associated with each historical document was operating during a first time period; and the health score for the document indicates a probability that an organization associated with the document will be operating after a second time period.

* * * * *